UNITED STATES PATENT OFFICE.

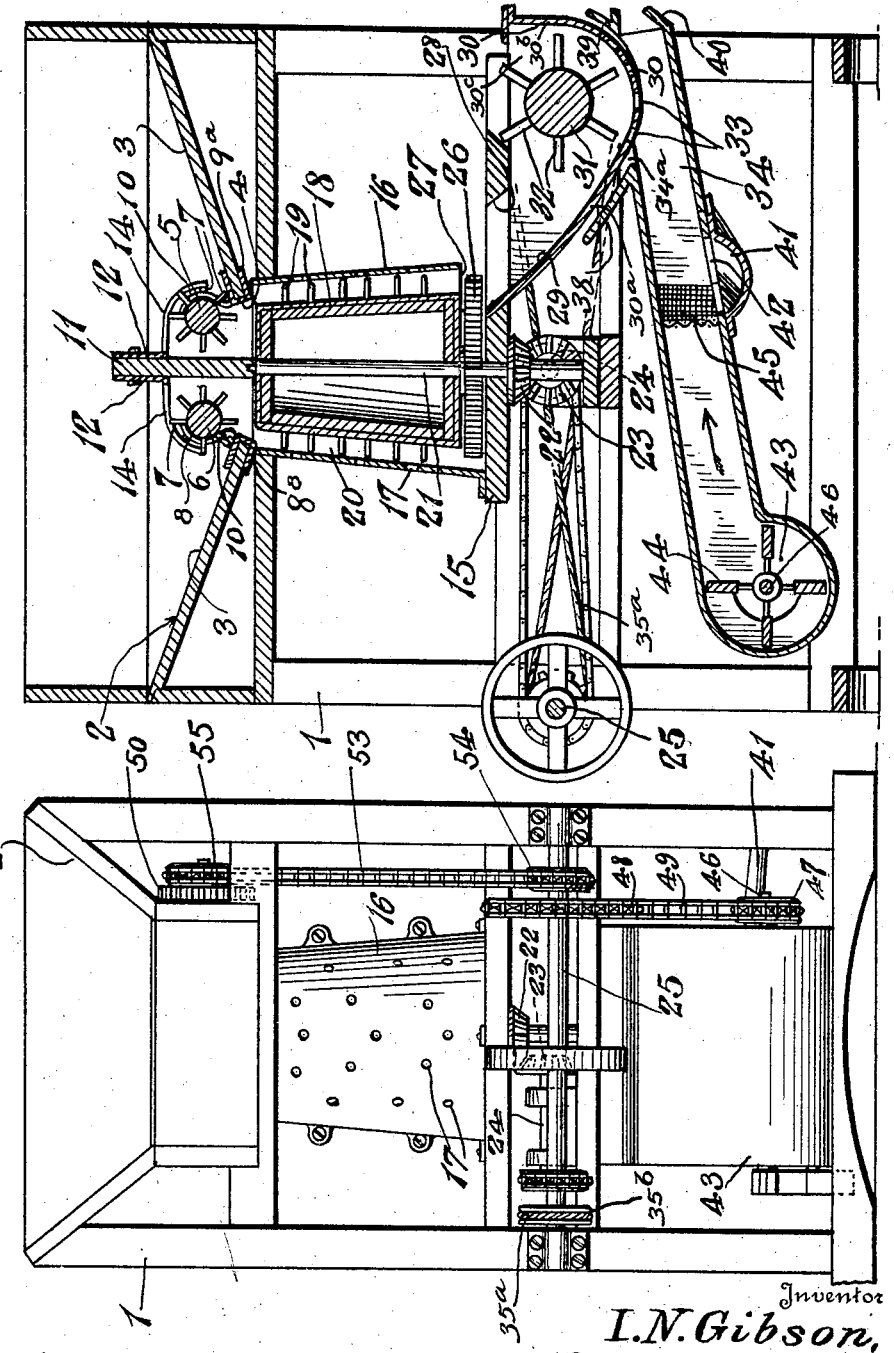

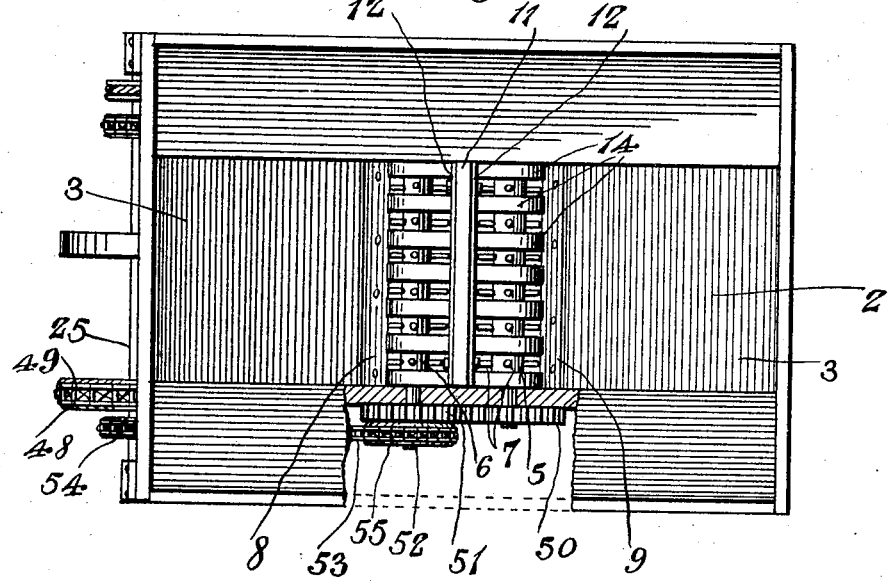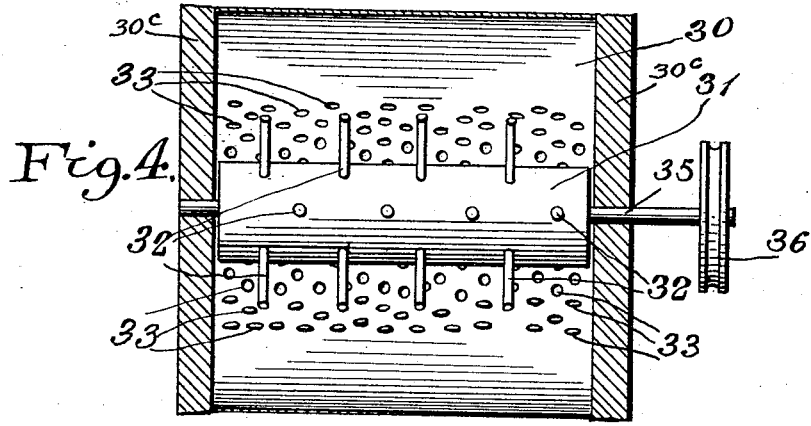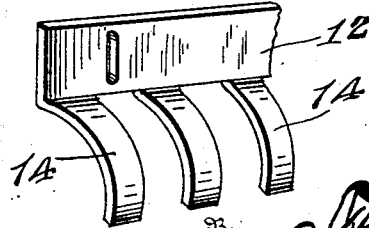

ISAAC N. GIBSON, OF DECATUR, MISSISSIPPI.

THRESHER.

1,325,150. Specification of Letters Patent. Patented Dec. 16, 1919.

Application filed June 22, 1914. Serial No. 846,639.

*To all whom it may concern:*

Be it known that I, ISAAC N. GIBSON, a citizen of the United States, residing at Decatur, in the county of Newton and State of Mississippi, have invented certain new and useful Improvements in Threshers, of which the following is a specification.

This invention relates to threshers, and the primary object of the invention is the provision of a thresher for threshing or hulling peas, beans, or similar agricultural products.

Another object of this invention is the provision of a plurality of rotary beaters, arranged in series upon a supporting structure, which beaters will efficiently crush the pods of the agricultural products so that the seed or kernels will be separated therefrom and blown from the thresher by a fan, efficiently threshing and cleaning the seeds in one continuous operation.

A still further object of this invention is the provision of a vertically disposed rotatable beater which is substantially frusto-conical in shape, so as to assist in the crushing of the pods during the falling movement of the latter from the receiving hopper.

With the foregoing and other objects in view, this invention consists in such novel features of construction, combination, and arrangement of parts as will be hereinafter more fully described, illustrated in the accompanying drawings, and claimed.

In describing the invention in detail, reference will be had to the accompanying drawings, wherein like characters of reference designate like or corresponding parts throughout the several views, and in which:—

Figure 1 is an end view of the improved thresher,

Fig. 2 is a central sectional view through the improved thresher,

Fig. 3 is a top plan view, showing parts thereof broken away,

Fig. 4 is a detail plan view of one of the beaters employed in the construction of the thresher, and, Fig. 5 is a detail fragmentary perspective view of a part of the construction of one of the beaters.

Referring more particularly to the drawings, 1 designates the supporting structure of the thresher, which has the receiving hopper 2 formed upon the upper end of the same. The bottom 3 of the hopper 2 is inclined, as is clearly shown in Fig. 2 of the drawings, as are the side walls of the same, and the bottom 3 is provided with a centrally disposed rectangular opening 4, above which a pair of beating and feeding rollers 5 and 6 are rotatably mounted. The beaters 5 and 6 have a plurality of radiating fingers or pins 7, which engage and pull the pods through the lower ends of openings 10 in plates 8 and 9. These plates extend longitudinally of the rollers 5 and 6, are curved to conform to the curvature of the rollers, and are secured to the bottom 3 of the hopper by brackets $8^a$ and $9^a$, respectively. The pods are torn or crushed while being pulled through the openings 10 of the plates 8 and 9 by the fingers 7.

A partition 11, which is mounted in hopper 2 between the two beating rollers 5 and 6, and which extends above and below the rollers, prevents the pods from passing from one beating roller to the other while being fed to the casing 16, and insures the proper feeding of the pods to the rollers. Guiding plates 12 are secured to the opposite sides of the partition 11, and have arcuate fingers 14 which extend transversely from the partition and outwardly over the upper surface of the beating rollers 5 and 6 as is clearly shown in Fig. 2 of the drawings.

The supporting frame 1 has a transversely extending platform 15 positioned therein, upon which platform is supported a substantially frusto-conical casing 16, which casing is provided with a plurality of perforations 17. A substantially frusto-conically shaped beater 18 is disposed centrally within the casing and is rotatable vertically therein. The beater 18 is provided with a plurality of radiating fingers 19, which further crush or tear the pods and separate the pods from the seeds during the passage of the pods and seeds through the space 20 between the beater 18 and the casing 16.

The beater 18 is fixed to a rotatably mounted vertical shaft 21, which has a bevel gear 22 secured to its lower end. The bevel gear 22 meshes with a second bevel gear 23, which latter gear is mounted upon a stub shaft 24. The stub shaft 24 has belted or chain connection with the power shaft 25 of the thresher, so that the beater will be rotated upon the rotation of the power shaft 25.

The shaft 21 has a plurality of radiating arms 26 mounted thereupon, beneath the lower end of the beater 18, which arms engage the pods and seeds when they reach the lower end of the casing 16, and force them outwardly through the opening 27 in the lower end of the casing 16. The seeds and pods then pass into a cradle 29 through a slot 28 in the platform 15.

The cradle 29 has a curved bottom wall 30 having perforations 33, a relatively long and downwardly inclined rear wall 30ª, an upwardly extending front wall 30ᵇ and end walls 30ᶜ. The rear, bottom and front walls are formed from a sheet of elastic metal. The upper end of the rear wall 30ª extends above the end walls 30ᶜ and is attached to the rear wall of the opening 28. As the extension of the rear wall 30 forms the only support for the cradle and as this wall is made of elastic material the cradle vibrates during the operation of the machine.

A rotary agitator, consisting of a cylinder 31 having a plurality of radiating fingers or pins 32, is fixed to a shaft 35 journaled in the end walls 30ᶜ of the cradle. The agitator is driven from the shaft 25 by a belt 35ª which passes about a pulley 35ᵇ on the shaft and about a pulley 36 on the shaft 35. The agitator is arranged circumferentially with relation to the bottom wall 30 and in close proximity to the front wall 30ᵇ. In view of the manner in which the cradle is supported, and as the agitator is wholly supported by the cradle, the agitator will during rotation vibrate the cradle and keep the seeds and crushed or torn pods therein in motion. The vibration of the cradle and the motion of the seeds and crushed or torn pods cause the seeds to pass through the perforations 33 and the pods to rise to the top of the mass and discharge over the front end of the cradle. The rear wall causes the seeds and crushed or torn pods to travel to the bottom of the cradle as they are fed to opening 28 by the feeder 26.

A chute 34 is supported in the lowermost portion of the supporting frame 1, in any suitable manner. The chute 34 has an outlet opening 40 in the front end thereof, and it also has a spout 41 secured to the under surface thereof intermediate its ends. The spout 41 has communication with the interior of the chute through an opening 42 formed in the bottom wall of the chute. The chute 34 extends downwardly at an angle from the base of the cradle 30, so that the seeds dropping into the cradle through the openings 33 will roll downwardly along the bottom wall of the chute and into the spout 41, which spout is also positioned at an incline, so that the seeds will roll out of the spout into any suitable container. The bottom wall 30 of the cradle 29 extends into the chute 34 through an opening 34ª formed in the top wall of the chute. Flanges 38 and 39 are formed on this wall of the chute in rear and in front of the opening 34ª. These flanges insure the entrance into the chute 34 of all seeds passing from the cradle 29.

The lower end of the chute 34 is enlarged to provide a fan casing. The hub 43 of the fan 44 is secured to a shaft 46 which is journaled in the side walls of the fan casing. A foraminous partition 45 is mounted in the chute 34 in rear of the opening 42, so as to prevent the passage of any of the seeds into the fan casing. The shaft 46 is connected to the power shaft 25 in any suitable manner, as for instance by sprockets 47 and 48 and a sprocket chain 49. The shafts upon which the beating rollers 5 and 6 are mounted are provided with intermeshing gears 50 and 51, as shown in Fig. 3 of the drawings. The shaft 52 upon which the gear 51 is mounted, is connected to the power shaft 25 in any suitable manner, as for instance by sprockets 53 and 54, and a sprocket chain 55.

In practice, beans, peas or the like are placed in the hopper 2 and are fed downwardly in the direction of the rollers 5 and 6 by the inclined bottom and side walls of the hopper. These rollers crush or tear the pods and force them downwardly through the opening 4 into the casing 16. The pods are, during their passage through the casing 16, acted upon by the beater 18 which detaches the seeds from the pods. After the pods and the seeds reach the lower end of the casing 16, they are fed to the cradle 29 through the opening 28 by the arms 26. The openings 17 in the casing 16 permit the escape of dust from the casing.

The openings 33 in the bottom wall of the cradle 30 are of such size as to permit the seeds and only small particles of the pods to fall therethrough into the chute 34. The pod particles and dust will be discharged through the opening 40 of the chute 34 by the air blast created by the fan 44. The seeds will travel down the bottom wall of the chute and out through the spout 41 into a receptacle. The blast of air will also force any inferior or light peas or seeds out through the opening 40, and thus a practically perfect grade of seeds will be discharged from the spout 41. The agitator and the vibration of the cradle will insure the passage of the seeds into the spout 34 and the discharge of the pods over the front end of the cradle.

From the foregoing description, taken in connection with the accompanying drawings, the advantages of the construction and of the method of operation of the improved thresher will be readily apparent to those skilled in the art to which the invention appertains and, while in the foregoing, the principle of the operation has been described, together with various features of construction, it is to be understood that certain minor features of construction, combination, and arrangement of parts may be altered to suit practical conditions, provided such alterations are comprehended within the scope of what is claimed.

What is claimed is:—

1. A thresher of the character set forth, comprising a hopper having a discharge opening, a beating and feeding mechanism in the hopper above said opening, a beating mechanism located below said opening, a vibratory cradle having a perforated bottom wall and located below said second mechanism, a separator located below said cradle, and an agitator journaled in the cradle.

2. A thresher of the character set forth, comprising a hopper having a discharge opening, a pair of beating and feeding mechanisms located in said hopper above said opening, a partition located between said mechanisms and extending above and below the same, a beating mechanism located below said opening, a vibratory cradle having a perforated bottom wall and located below said second mechanism, a separator located below said cradle, and an agitator journaled in the cradle.

3. A thresher of the character set forth, comprising a vibratory cradle having a perforated bottom wall, means for feeding crushed pods and seeds to the cradle, an agitator journaled in the cradle and adapted to vibrate the same, a chute having an opening in one end and an opening in its upper side, the bottom of the cradle extending through said opening into said chute, a fan located in the other end of the chute, and a spout communicating with said chute.

4. A thresher of the character set forth including a vibratory cradle having a perforated bottom wall, means for feeding seeds and crushed pods to the cradle, an agitator journaled in the cradle and adapted to directly vibrate the same, and a separator located below the cradle.

In testimony whereof I affix my signature in presence of two witnesses.

ISAAC N. GIBSON.

Witnesses:
  MACK DANSBY,
  J. T. McCUNE.